United States Patent [19]

Leigh-Monstevens et al.

[11] Patent Number: 4,831,916

[45] Date of Patent: May 23, 1989

[54] PISTON ASSEMBLY

[76] Inventors: Keith V. Leigh-Monstevens, 5622 Larkins Dr., Troy, Mich. 48098; Leslie P. Branum, 2717 Roundtree, Troy, Mich. 48083; David C. Barker, 14872 Village Ct., Utica, Mich. 48087

[21] Appl. No.: 56,058

[22] Filed: Jun. 1, 1987

[51] Int. Cl.⁴ .............................................. F16J 1/10
[52] U.S. Cl. ...................................... 92/129; 92/248; 92/187; 403/135; 403/143; 403/76; 403/165; 60/582
[58] Field of Search ................. 92/129, 248, 187, 188; 60/533, 585, 586, 594, 584, 583, 582, 588; 403/135, 140, 143, 76, 165

[56] References Cited

U.S. PATENT DOCUMENTS

| | | | |
|---|---|---|---|
| 2,059,444 | 11/1936 | Dick | 60/588 |
| 2,258,034 | 10/1941 | Schnell | 60/589 |
| 2,615,304 | 10/1952 | Groves | 60/586 |
| 2,726,124 | 12/1955 | Boyce | 92/254 |
| 2,941,367 | 6/1960 | Schwab | 92/187 |
| 3,173,266 | 3/1965 | Shutt | 92/187 |
| 3,173,344 | 3/1965 | Mongitore | 92/187 |
| 3,212,483 | 10/1965 | Balzer | 92/187 |
| 3,263,311 | 8/1962 | Riedhammer et al. | 92/187 |
| 3,331,288 | 7/1967 | Kolthoff | 92/187 |
| 3,482,487 | 12/1969 | Leffers | 92/187 |
| 4,072,014 | 2/1978 | Garoner | 60/588 |
| 4,528,895 | 7/1985 | Nakamura | 92/129 |
| 4,569,271 | 3/1909 | Reynolds | 91/25 |

FOREIGN PATENT DOCUMENTS

| | | | |
|---|---|---|---|
| 0185165 | 6/1986 | European Pat. Off. | |
| 2510609 | 11/1975 | Fed. Rep. of Germany | 92/187 |
| 3149628 | 7/1983 | Fed. Rep. of Germany | |
| 3247116 | 6/1984 | Fed. Rep. of Germany | |
| 3431115 | 3/1986 | Fed. Rep. of Germany | |
| 372817 | 12/1906 | France | 92/187 |
| 0129962 | 8/1982 | Japan | 92/187 |
| 58-84263 | 5/1983 | Japan | 92/187 |
| 562789 | 7/1944 | United Kingdom | 60/588 |
| 1354987 | 5/1974 | United Kingdom | 60/582 |
| 959138 | 5/1974 | United Kingdom | 60/588 |

Primary Examiner—Robert E. Garrett
Assistant Examiner—Thomas Denion
Attorney, Agent, or Firm—Krass & Young

[57] ABSTRACT

A piston assembly including a plastic piston defining a socket at its rear face and a metallic annular insert member positioned within the socket and receiving the piston rod of the piston assembly in acting to increase the effective area over which the loading from the piston rod is applied to the plastic piston so as to allow the plastic piston to be used in environments where it might otherwise fail due to the high stress loading. The annular insert also includes prongs struck from the main body portion of the insert member and coacting with an annular shoulder on the piston rod to preclude axial withdrawal of the piston rod from the piston and further includes an annular flange portion which acts to facilitate positioning of the insert member in the socket in the piston and further acts to define the fully retracted or extended position of the piston in coaction with a snap ring on the inner periphery of the associated cylinder.

11 Claims, 2 Drawing Sheets

PISTON ASSEMBLY

BACKGROUND OF THE INVENTION

This invention relates to piston assemblies and more particularly to a piston assembly especially suited for use with a hydraulic cylinder assembly.

Piston assemblies, including a piston mounted for sliding movement in a cylinder and a piston rod extending into one end of the cylinder for connection to the piston, are in common usage in many areas. For example, prefilled hydraulic master and slave cylinder assemblies of the type shown in U.S. Pat. No. 4,599,860 to David Parsons and assigned to Automotive Products plc of Warwickshire, England, employ a piston assembly in the master cylinder as well as a similar piston assembly in the slave cylinder. These piston assemblies typically employ a metallic piston sliding in a metallic cylinder with a metallic piston rod connected to the piston. Whereas these metallic assemblies are generally satisfactory, they are relatively costly to produce, both from a materials and time standpoint. Whereas efforts have been made in the past to construct piston assemblies in whole or in part of nonmetallic materials such for example as plastic, problems have been encountered with these nonmetallic prior art assemblies because of the limited ability of the plastic or other nonmetallic material to withstand the loading encountered in certain environments such for example as the high pressure environment of the hydraulic master and slave cylinder assembly of the type shown in U.S. Pat. No. 4,599,860.

SUMMARY OF THE INVENTION

This invention is directed to the provision of an improved piston assembly.

More specifically, this invention is directed to the provision of a piston assembly which is formed of nonmetallic material and yet which is capable of providing satisfactory use over long periods of time even in high load environments.

According to the invention, the piston defines a rearwardly opening socket at its rear face, a piston rod passes through the rear end of the associated cylinder and includes a head portion for positioning in the socket in the piston; and an annular insert member is positioned in the socket between the piston and the piston rod head portion. The insert member has the effect of distributing the loading imparted to the piston from the piston rod over a relatively large effective area of the piston so as to minimize stress and distortion of the piston.

According to a further feature of the invention, the piston is formed of a plastic material and the insert member is formed of a metallic material. This arrangement allows the piston to be inexpensively molded and allows an inexpensive metallic insert to be utilized to spread the loading on the piston so as to minimize distortion of the plastic material of the piston.

According to a further feature of the invention, a rearwardly facing annular surface is defined on the piston rear face in surrounding relation to the socket; the socket includes a generally cylindrical main body surface portion extending forwardly from the piston rear face and a forward blind end portion; and the insert member includes a tubular main body portion adapted to be seated in the socket within the generally cylindrical main body socket portion and an annular flange portion on the rear end of the main body portion adapted to be seated against the piston annular surface. This arrangement allows the insert member to be readily inserted into the socket for receipt of the head portion of the piston rod.

According to a further feature of the invention, the blind end portion of the socket is generally hemispherical; the insert member further includes a generally hemispherical end portion at the forward end of the main body portion adapted to be seated against the generally hemispherical blind end portion of the socket; and the piston head portion is generally hemispherical and is adapted to be seated in the generally hemispherical end portion of the insert member. This arrangement provides a convenient and efficient nesting arrangement for the insert member and piston rod head portion and facilitates distribution of the piston rod loading over a wide effective area of the piston.

According to a further feature of the invention, the piston rod includes an annular, rearwardly facing shoulder at the rear end of the head portion thereof and the insert member further includes a plurality of tab portions struck inwardly from the main body portion thereof for engagement with the annular shoulder on the piston rod. This arrangement ensures that the piston rod will be positively secured within the insert member in response to insertion of the piston rod into the insert member.

DETAILED DESCRIPTION OF THE PREFERRED EMBODIMENT

Figure 1:
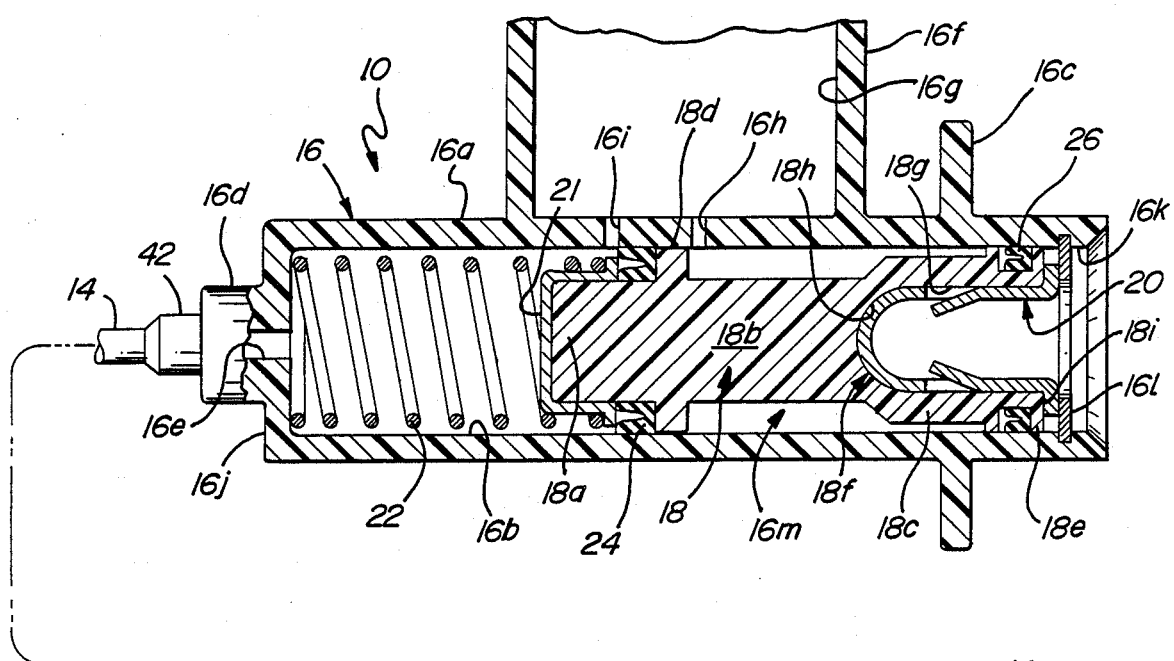
FIG. 1 is a schematic fragmentary view of a hydraulic master cylinder and slave cylinder apparatus employing the piston assembly of the invention.
Figure 1:
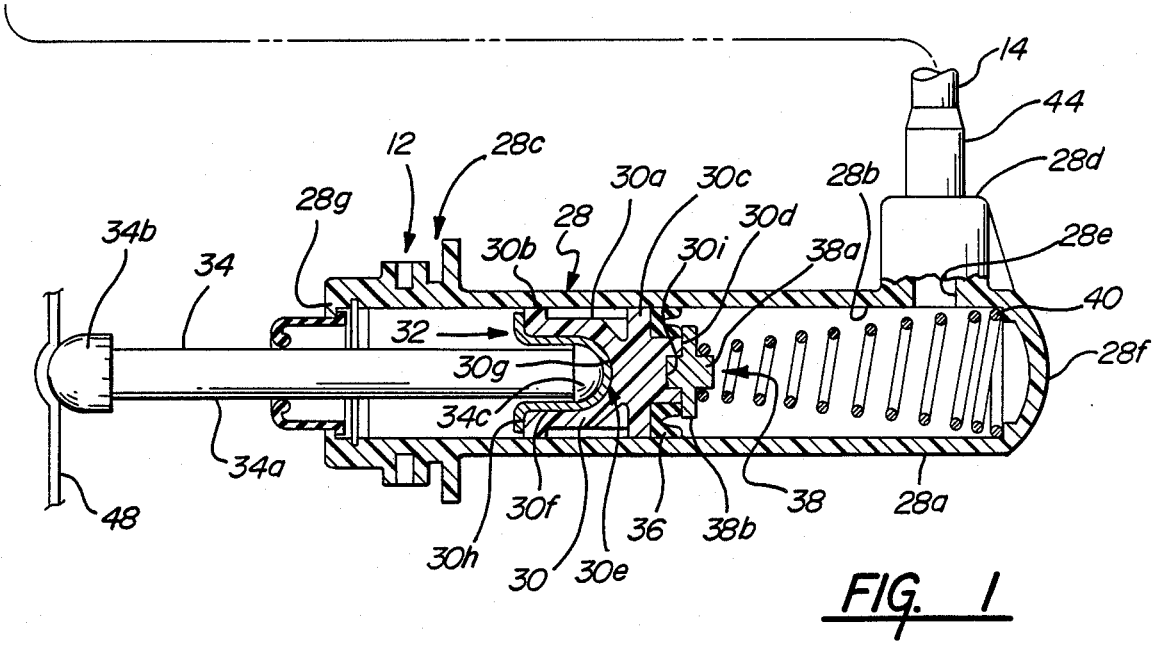
Figure 2:
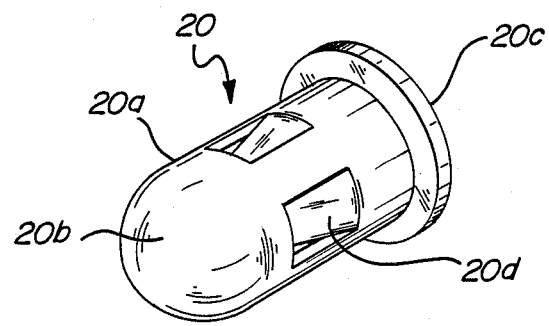
FIG. 2 is a perspective view of an insert member employed in the invention piston assembly.
Figure 3:
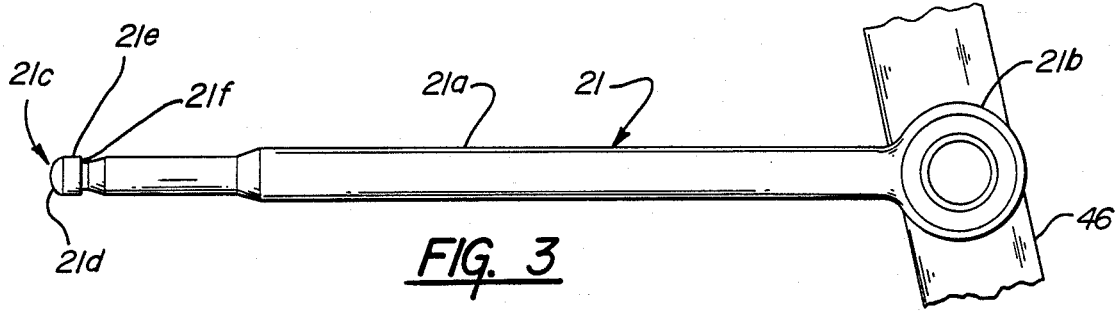
FIG. 3 is a view of a piston rod for use with the invention piston assembly.
Figure 4:
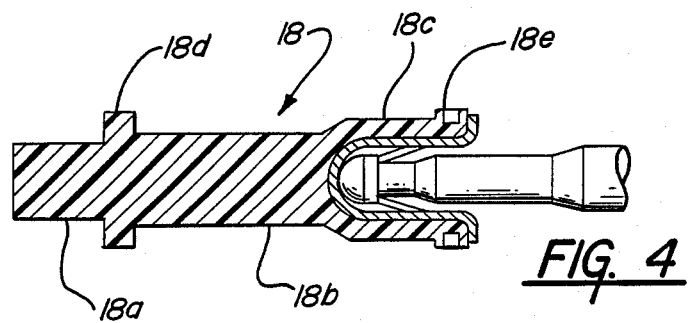
FIG. 4 is a view showing the assembled relation of the piston rod of FIG. 2 in the piston assembly of the master cylinder of the hydraulic apparatus of FIG. 1.
Figure 5:
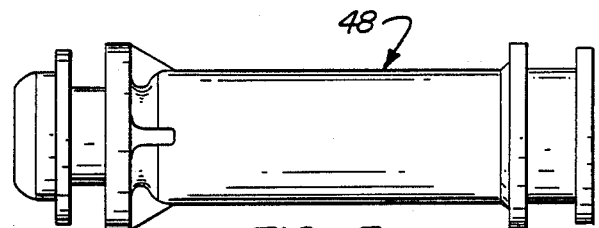
FIGS. 5-8 illustrate a modified form of the piston assembly of the invention.
Figure 6:
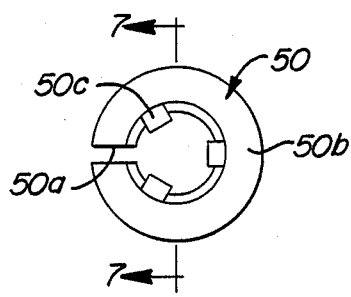
Figure 7:
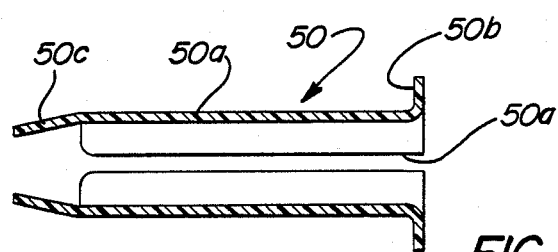

The hydraulic apparatus of FIG. 1 includes a master cylinder assembly 10, a slave cylinder assembly 12, and a conduit 14.

Master cylinder assembly 10 includes a cylinder 16, a piston 18, and a push rod or piston rod 21.

Cylinder 16 is formed of a suitable plastic material and includes a main body portion 16a defining a pressure chamber 16b, a flange portion 16c proximate the front end of the cylinder for mounting the cylinder 16 to a suitable vehicular bulkhead in known manner, an outlet fitting 16d at the rear end of the cylinder defining an outlet port 16e, and at integral upstanding reservoir portion 16f defining a reservoir chamber 16g communicating with pressure chamber 16b through a first port 16h and a second port 16i. Cylinder 16 is closed at its front end 16j and open at its rear end 16k and includes a snap ring 16l suitably positioned in the open end 16k of the cylinder.

Piston 18 is formed of a suitable plastic material such, for example, as a glass reinforced nylon, or a lubricated plastic including an internal lubricant such as molybdenum disulfide. Piston 18 includes a nose portion 18a, a main body portion 18b, a trailing or rear portion 18c, a front flange portion 18d, and a rear flange portion 18e. Piston 18e is slidably received in pressure chamber 16b with a cup shaped spring retainer 21 positioned over nose portion 18a, a coil spring 22 seated at one end over retainer 21 and bearing at its other end against closed end 16j of cylinder 16, an annular seal 24 positioned forwardly of flange portion 18d, and a further annular seal 26 positioned in a groove in flange portion 18e.

A socket 18f is provided in the rear face of the piston and includes a main body cylindrical portion 18g extending forwardly from the rear face of the piston and a generally hemispherical front end portion 18h. An annular surface 18i is defined on the rear face of the piston in surrounding relation to socket 18f. Socket 18f is centered on the center line of piston 18 and on the center line of cylinder 16.

Insert member 20 is formed as a metal stamping and includes a cylindrical main body portion 20a, a generally hemispherical front end portion 20b, and an annular flange portion 20c at the rear end of the insert member. A plurality of prongs or tabs 20d are struck inwardly from main body portion 20a at circumferentially spaced locations thereabout. Prong portions 20d extend inwardly and forwardly toward hemispherical front end portion 20b. Insert 20 is preferably formed of a ferrous material but may also be formed of other metallic materials.

Push rod or piston rod 21 is formed of a suitable metallic material and includes a main body portion 21a, a front end portion 21b in the form of an eye, and a head portion 21c at the forward end of the rod. Head portion 21c includes a generally hemispherical front end portion 21d and a cylindrical portion 21e positioned rearwardly of hemispherical portion 21d. An annular rearwardly facing shoulder 21f is defined at the rear end of the head portion. Slave cylinder 12 includes a cylinder 28, a piston 30, a retainer member 32, and a push rod or piston rod 34.

Cylinder 28 is formed of a suitable plastic material and includes a main body portion 28a defining a pressure chamber 28b, a flange portion 28c proximate the front end of main body portion 28a for mounting the cylinder on a suitable vehicular bulkhead, an inlet fitting 28d at the rear end of main body portion 28a defining an inlet port 28e, a closed rear end 28f, and an open front end 28g. Cylinder 28 is formed of a suitable plastic material such as 66-612 nylon.

Piston 30 is formed of a glass reinforced nylon or a plastic material having an internal lubricant such as molybdenum disulfide and includes a main body portion 30a, a forward flange portion 30b, a rearward flange portion 30c, and a nose portion 30d. A socket 30e is defined in the front face of the piston and includes a cylindrical main body portion 30f and a generally hemispherical rear end portion 30g. An annular forwardly facing surface 30h is defined on the forward end of the piston in surrounding relation to the socket. A seal 36 is positioned on nose portion 30d and precluded from axial movement on the nose portion by a plug 38.

Plug 38 is formed of the same plastic material as piston 30 and includes a main body portion 38a and a flange portion 38b. The forward end of plug main body portion 38a is telescopically received in a socket 30i defined at the rear face of piston 30. Plug 38 is secured to piston 30 by ultrasonic welding.

Piston 30 is slidably received in pressure chamber 28b with a conical coil spring 40 seated at one end over the rear end of main body portion 38a of plug 38 and seated at its other end against closed end 28f of cylinder 28.

Push rod or piston rod 34 is formed of a metallic material and includes a main body portion 34a, a hemispherical front end portion 34b, and a hemispherical rear end portion 34c.

Conduit 14 is formed of a suitable nylon material and is preferably preformed into a predetermined configuration such as that illustrated in FIG. 1. Conduit 14 is secured to master cylinder outlet 16d by a coupling 42 and is secured at its other end to slave cylinder inlet 28d by a coupling 44.

In the assembled relation of master cylinder 10, piston 18 is slidably received in pressure chamber 16b; insert member 20 is press fit or adhesively secured into socket 18f with hemispherical end portion 20b seated against hemispherical socket portion 18h, main body portion 20a seated telescopically within main body socket portion 18g, and annular flange portion 20c seated against piston annular surface 18i; piston rod 21 is received in insert member 20 with piston rod hemispherical portion 21d seated against insert member hemispherical portion 20b and prongs 20d engaging shoulder 21f to preclude rearward movement of the piston rod relative to the piston; and spring 22 acts against the front end of the piston and urges the piston rearwardly within pressure chamber 16b to seat flange portion 20c of the insert member against snap ring 16l and thereby establish the rest or retracted position of the master cylinder assembly. In this retracted position, port 16i places reservoir 16f in fluid communication with pressure chamber 16b forwardly of the piston and port 16h establishes fluid communication between the reservoir and the annular chamber 16m defined around piston main body portion 18b.

In the assembled relation of slave cylinder 12, piston 30 is slidably received in pressure chamber 28b; insert member 32 is press fit in socket 30e; piston rod 34 is positioned with its rearward hemispherical head portion 34c received within insert member 32; and coil spring 40 acts to urge piston 30 toward the open or forward end of cylinder 28.

In the installed relation of the hydraulic master and slave cylinder apparatus of FIG. 1 in a motor vehicle, flange portion 16c of master cylinder 16 is secured to a suitable vehicular bulkhead; eye 21b of master cylinder piston rod 21 is pivotally secured to a clutch pedal lever 46; flange portion 28c of slave cylinder 28 is secured to a suitable vehicular bulkhead; and hemispherical front end portion 34b of piston rod 34 engages the upper end of a clutch release lever 48.

In the operation of the installed hydraulic apparatus, operator depression of the clutch pedal lever 46 pushes push rod 21 forwardly to advance piston 18 within pressure chamber 16b and force pressurized fluid out of outlet port 16e for passage through conduit 14 to pressure chamber 28b of slave cylinder 12 where it acts on piston 30 to move the piston forwardly within the cylinder and advance push rod 34 to move clutch release lever 46 to a clutch released position.

As push rod 21 acts against piston 18, insert member 20 acts to distribute the loading with respect to the piston and as piston 30 acts on push rod 34 insert member 32 acts to distribute the loading with respect to piston.

Specifically, whereas a typical ball and socket connection as between a piston rod and a piston acts to distribute the loading on the piston from the piston rod over an effective area approximating the transverse cross-sectional area of the head of the piston rod, the invention insert member acts to increase the effective loading area by the annular cross-sectional dimension of the insert member and thereby discourage cold flow or distortion of the piston in response to loading from the piston rod. The invention arrangement, employing a metallic insert member between the spherical end of the push rod and the blind end of a socket in a plastic piston, has been found to significantly reduce the unit loading on the piston and enable a plastic piston to be employed in environments where it would otherwise undergo cold flow such as to eventually produce binding of the piston in the cylinder or other failure of the piston. The annular flange portion of the insert member of the invention also serves to positively position the insert member in the socket of the piston and coacts with the associated snap ring in the open end of the cylinder to define the fully retracted position of the piston in the cylinder and thereby define the fully retracted position of the clutch pedal lever. The annular flange portion of the insert member also transfers axial loading from the push rod to the snap ring so as to preclude the possibility of the push rod tearing the insert member out of the socket in the piston in response to retracting movement of the push rod.

The annular insert member 32 in the slave cylinder acts in a similar manner to distribute the loading as between push rod 34 and piston 30 so that the loading is distributed over an effective area corresponding to the transverse cross-sectional area of the head 34c of the piston rod plus the annular area defined by the main body portion 30f of the insert member so that, as with the insert member in the master cylinder, the invention insert member acts to distribute loading as between the piston rod and the piston over a substantially larger area and enable the plastic piston to be used in an environment where it might otherwise fail due to cold flow or other failure mode.

The modified form of piston assembly seen in FIGS. 5-8 includes a piston 48 formed of a suitable plastic material and an annular insert 50 formed as a spring steel stamping.

Piston 48 includes a tubular main body portion 48a defining a central axial socket 48b opening in the rear face of the piston and an annular seat 48c defined on the rear end of the piston in surrounding relation to socket 48b. Socket 48b includes a main body cylindrical surface portion 48d and a generally hemispherical front end portion 48e at the blind forward end of the socket.

Figure 8:
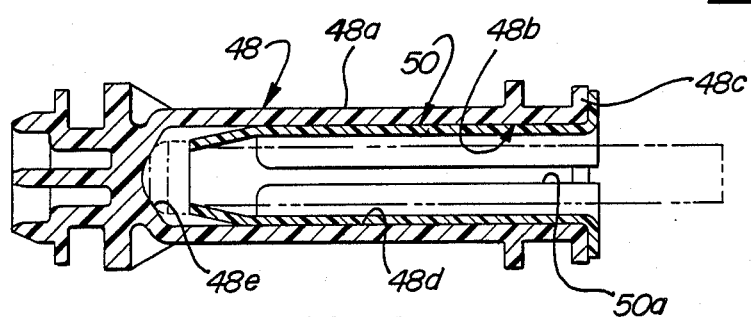

Annular insert 50 is axially split at 50a and includes a split tubular main body portion 50a adapted to seat within socket portion 48d, a split annular flange portion 50b at the rear end of the tubular main body portion adapted to seat against annular piston seat 48c, and a plurality of circumferentially spaced prong portions 50c extending forwardly from main body portion 50 for locking engagement, as seen in FIG. 8, with the annular rearwardly facing shoulder formed on the associated push rod at the rear end of the head portion of the push rod so as to preclude axial withdrawal of the push rod from the piston.

It will be seen that the invention piston assembly provides a simple and inexpensive means of enabling plastic pistons to be employed in environments where they might otherwise fail due to cold flow resulting from unit stresses beyond the capability of the plastic material. The annular insert member also provides a convenient means of retaining the piston rod with respect to the piston and further provides a convenient means of defining the fully retracted or extended position of the piston in the associated cylinder.

Whereas a preferred embodiments of the invention have been illustrated and described in detail, it will be apparent that various changes may be made in the disclosed embodiments without departing from the scope or spirit of the invention.

What is claimed is:

1. A cylinder assembly comprising:
A) a cylinder defining a piston bore;
B) a piston member slidably mounted in said bore, formed of a rigid non-metallic material, and defining a rearwardly opening socket at its rear face and an annular surface at its rear face in surrounding relation to said socket;
C) an annular generally cup-shaped insert member formed of a metallic material, sized to fit within said socket in said piston, and including a forward blind end portion adapted to be juxtaposed to the forward blind end of said socket and a rearward flange means adapted to be seated against said piston annular surface;
D) spring means within said bore biasing said piston member toward a rearwardly retracted position within said bore; and
E) a ring positioned in said bore proximate the rearward end of said bore and having an internal diameter less than the external diameter of said insert member flange means so as to coact with said flange means to define the rearwardly retracted position of said piston member within said bore.

2. A piston assembly according to claim 1 wherein:
F) said socket includes a generally cylindrical main body surface portion extending forwardly from said piston rear face to said forward blind end;
G) said insert member includes a tubular main body portion adapted to be seated in said socket within said generally cylindrical main body surface portion; and
H) said flange means comprises an annular flange portion on the rear end of said insert member main body portion adapted to be seated against said piston annular surface.

3. A piston assembly according to claim 2 wherein:
I) said blind end portion of said socket is generally hemispherical; and
J) said insert member blind end portion is generally hemispherical and seats against said generally hemispherical blind end portion of said socket.

4. A piston according to claim 3 wherein:
K) said assembly further includes a piston rod having a generally hemispherical head portion adapted to be seated in said generally hemispherical blind end portion of said insert member.

5. A piston assembly according to claim 4 wherein:
L) said piston rod includes an annular rearwardly facing shoulder at the rear end of said head portion; and
J) said insert member further includes a plurality of tab portions struck inwardly from said main body portion for engagement with said annular shoulder.

6. A cylinder assembly comprising:
A) a cylinder defining a pressure chamber;
B) a piston slidably received in said pressure chamber and defining a rearwardly opening socket at its rear face, having a blind forward end, and an annular surface at its rear face in surrounding relation to said socket;

C) a piston rod passing through the rear end of said cylinder and into said socket and including a head portion for positioning in said blind end of said socket and an annular rearwardly facing shoulder at the rear end of said head portion; and D) an insert member including an annular main body portion positioned in said socket between said piston and said piston rod, a plurality of circumferentially spaced prong portions extending radially inwardly and forwardly from said main body portion for engagement with said annular shoulder on said piston rod, and a flange portion at the rear end of said main body portion seated against said annular surface on said piston.

7. A cylinder assembly according to claim 6 wherein:

E) said piston is formed of a plastic material; and

F) said insert member is formed of a metallic material.

8. A cylinder assembly according to claim 7 wherein:

G) said cylinder is formed of a plastic material.

9. A cylinder assembly comprising:

A) a cylinder defining a pressure chamber;

B) a piston slidably received in said pressure chamber and defining a rearwardly opening socket at its rear face and a rearwardly facing annular surface on its rear face in surrounding relation to said socket, said socket including a generally cylindrical main body surface portion extending forwardly from said piston rear face and a forward blind end portion;

C) an insert member including a tubular main body portion adapted to be seated in said socket within said generally cylindrical main body socket portion, a plurality of tab portions struck inwardly from said main body portion, and an annular flange portion on the rear end of said main body portion adapted to be seated against said piston annular surface; and D) a piston rod passing through the rear end of said cylinder and into said insert member and including a head portion defining a rearwardly facing shoulder for coaction with said insert member tab portions to secure said piston rod in said insert member in response to insertion of said piston rod into said insert member.

10. A cylinder assembly according to claim 9 wherein:

E) said blind end portion of said socket is generally hemispherical;

F) said insert member further includes a generally hemispherical end portion at the forward end of said main body portion adapted to be seated against said generally hemispherical blind end portion of said socket; and G) said piston rod head portion is generally hemispherical and is adapted to be seated in said generally hemispherical end portion of said insert member.

11. A cylinder assembly according to claim 10 wherein:

H) said piston is formed of a plastic material; and

I) said insert member is formed of a metallic material.

* * * * *

UNITED STATES PATENT AND TRADEMARK OFFICE
CERTIFICATE OF CORRECTION

PATENT NO. : 4,831,916

DATED : May 23, 1989

INVENTOR(S) : Leigh-Monstevens et al.

It is certified that error appears in the above-identified patent and that said Letters Patent is hereby corrected as shown below:

On the face of the patent the Assignee of record is

Automotive Products plc, Warwickshire, England.

Signed and Sealed this

Seventeenth Day of April, 1990

Attest:

HARRY F. MANBECK, JR.

Attesting Officer

Commissioner of Patents and Trademarks